United States Patent
Park et al.

(10) Patent No.: US 8,363,638 B2
(45) Date of Patent: Jan. 29, 2013

(54) APPARATUS AND METHOD FOR FORWARDING VOICE PACKET IN A DIGITAL COMMUNICATION SYSTEM

(75) Inventors: Ho-Chong Park, Seongnam-si (KR);
Geun-Bae Song, Suwon-si (KR);
Jae-Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1254 days.

(21) Appl. No.: 11/338,888

(22) Filed: Jan. 25, 2006

(65) Prior Publication Data
US 2006/0182091 A1    Aug. 17, 2006

(30) Foreign Application Priority Data
Jan. 25, 2005    (KR) .................. 10-2005-0006883

(51) Int. Cl.
*H04Q 3/00*    (2006.01)
*H04M 7/00*    (2006.01)
*H04L 29/06*    (2006.01)
(52) U.S. Cl. ......... 370/352; 370/401; 370/345; 370/232
(58) Field of Classification Search .................. 370/352; 704/212
See application file for complete search history.

(56) References Cited

U.S. PATENT DOCUMENTS

| | | | |
|---|---|---|---|
| 5,519,779 A | 5/1996 | Proctor et al. | |
| 5,903,862 A * | 5/1999 | Weaver et al. | 704/212 |
| 6,006,189 A * | 12/1999 | Strawczynski et al. | 704/270 |
| 6,260,009 B1 | 7/2001 | Dejaco | |
| 6,785,339 B1 | 8/2004 | Tahernezhaadi et al. | |
| 6,865,391 B1 * | 3/2005 | Oh et al. | 455/445 |
| 7,103,033 B2 * | 9/2006 | Gao | 370/352 |
| 2002/0136164 A1 * | 9/2002 | Fukuda et al. | 370/230 |
| 2002/0141386 A1 * | 10/2002 | Minert et al. | 370/352 |
| 2003/0076793 A1 * | 4/2003 | Gao | 370/329 |
| 2003/0112821 A1 * | 6/2003 | Cleveland et al. | 370/468 |
| 2003/0142648 A1 * | 7/2003 | Semper | 370/331 |
| 2005/0002373 A1 * | 1/2005 | Watanabe et al. | 370/346 |

FOREIGN PATENT DOCUMENTS
KR    10-1999-0086058    12/1999

* cited by examiner

*Primary Examiner* — Asad Nawaz
*Assistant Examiner* — Jason Harley
(74) *Attorney, Agent, or Firm* — Roylance, Abrams, Berdo and Goodman, LLP

(57) ABSTRACT

A voice packet forwarding apparatus and method is provided in a digital communication system including a switched vocoder module to directly pass a voice packet received from a packet terminal to a digital communication network or a PCM signal decoded from the voice packet to the digital communication network. The switched vocoder module is also provided to directly pass a voice packet received from the digital communication network to the packet terminal or transmit a voice packet coded from a PCM signal received from the digital communication network. In the presence of additional data to be transmitted to the packet terminal, a data inserter is provided to insert the additional data in the voice packet received from the switched vocoder module and transmit the voice packet with the additional data to the packet terminal. A controller is provided to control the switched vocoder module and the data inserter.

13 Claims, 12 Drawing Sheets

APPARATUS AND METHOD FOR FORWARDING VOICE PACKET IN A DIGITAL COMMUNICATION SYSTEM

CROSS-REFERENCE TO RELATED APPLICATIONS

This application claims the benefit under 35 U.S.C. §119 (a) of Korean Patent Application No. 10-2005-0006883 entitled "Apparatus and Method for Forwarding Voice Packet in a Digital Communication System" filed in the Korean Intellectual Property Office on Jan. 25, 2005, the entire disclosure of which is hereby incorporated by reference.

BACKGROUND OF THE INVENTION

1. Field of the Invention

The present invention relates generally to a digital communication system. In particular, the present invention relates to an apparatus and method for forwarding voice packets over a network.

2. Description of the Related Art

A voice coder, namely a vocoder is used to reduce the amount of data taken to transmit information in digital voice communications. The vocoder, which is a combination of a voice encoder and a voice decoder, exists between a terminal and a communication system. The voice encoder converts an input Pulse Code Modulation (PCM) voice signal to a very small-size voice packet by using a predetermined coding algorithm. The voice packet is delivered to a destination through the communication system and the voice decoder recovers the voice packet to the original PCM voice signal by using a predetermined algorithm. Under this typical communication environment, voice communications are conducted in the order of input-coding-transmission-decoding-output. Coding-decoding can be repeated many times in a particular communication environment.

Many types of vocoders are available to digital mobile communication systems like Voice over Internet Protocol (VoIP), but different vocoders are not compatible with each other. Some vocoders support generation of voice packets at a plurality of data rates. These vocoders are called variable-rate vocoders. Typical examples of the variable-rate vocoders are Qualcomm Code Excited Linear Prediction (QCELP) and Enhanced Variable Rate Codec (EVRC) used for Code Division Multiple Access (CDMA). The variable-rate vocoders encode a voice signal according to the characteristics of the input voice signal or at a data rate requested by the communication system. With respect to a full rate, QCELP and EVRC can encode voice packets at a rate of ½, ¼ or ⅛.

There are generally two types of terminals in digital communications. One is a packet terminal that includes a vocoder and which transmits/receives voice packets to/from a communication system. A mobile terminal for digital mobile communications is a typical example. The other is a Public Switched Telephone Network (PSTN) terminal connected directly to a PSTN, for voice communications. The PSTN terminal does not have a vocoder and transmits/receives an analog signal to/from the communication system.

In the digital communication system, the transport format of a voice packet is determined according to the types of terminals and the positions and operations of vocoders, and communication performance is correspondingly determined. Best performance can be achieved by appropriately determining the position and operation of at least one vocoder according to the characteristics of two terminals connected for communication and their communication environment. The factors affecting the determination include the types of the terminals, the types of vocoders used in the terminals, packet data rate, transmission or non-transmission of additional data, and transmission or non-transmission of a message.

During communications between a packet terminal and a PSTN terminal, upon receipt of a voice packet from the packet terminal, a voice decoder in a communication system converts the voice packet to a PCM signal and provides it to the PSTN terminal. Upon receipt of a PCM signal from the PSTN terminal, a voice encoder in the communication system converts the PCM signal to a voice packet and provides it to the packet terminal. In the case of transmitting voice information together with a message to the packet terminal, the communication system decreases the data rate of the voice packet, relying on the features of the variable-rate voice encoder and inserts as much of the message as the rate decrease in the voice packet allows, prior to transmission. For this purpose, such a module generates control/signaling messages and adjusts the data rates of voice packets that may reside in the communication system. The packet terminal extracts the voice information and the message separately from the received voice packet and recovers the voice information to the PCM voice signal.

In a CDMA mobile communication system, for example, upon generation of a message to be transmitted to a Mobile Station (MS) on a radio channel, a Base Station (BS) decreases the rate of a voice packet destined for the MS to, for example, ½ and inserts the message in the voice packet. This message transmission scheme is called "Dim and Burst". In an extreme case, the rate of the voice packet is decreased to zero and only the message is constructed into a packet. This scheme is called "Blank and Burst". Due to the entire loss of the voice information at a message transmission time point, the Blank and Burst method is inferior to the Dim and Burst method in terms of voice quality.

In communications between two terminals, if each use the same kind of vocoders, the communication system forwards an input voice packet to the peer terminal for normal communications. This is called "Packet Bypass". However, if the two terminals use different, incompatible kinds of vocoders, the communication system converts an input voice packet appropriately. As described above, if additional data is to be inserted in a voice packet, even when the same kind of vocoders are used, the rate of the voice packet typically must be reduced. Consequently, voice packet conversion is required for transmission.

The steps by which voice packets are transmitted and processed depend on a communication environment in the digital communication system. Traditionally, voice packets are forwarded in the following way.

FIG. 1 illustrates a configuration of a typical PSTN-based voice packet forwarding system.

Referring to FIG. 1, when a call is set up between a first packet terminal 110 and a PSTN terminal 102, a voice encoder of the first packet terminal 110 converts an input voice signal to a voice packet 112. A first voice decoder 114 generates a PCM voice signal 116 from the voice packet 112 by using the same voice decoding scheme as used in the first packet terminal 110. A PSTN switch (not shown) in a network 100 converts the PCM voice signal 116 to an analog signal 104 and provides the analog signal 104 to the PSTN terminal 102.

The PSTN switch of the network 100 converts an analog signal 106 received from the PSTN terminal 102 to a PCM signal 118. A first voice encoder 120 converts the PCM signal 118 to a voice packet 122 by using the same voice coding scheme as used in the first packet terminal 110.

If there is no need for inserting additional data such as a control/signaling message, the voice packet 122 bypasses a first data inserter 124, thus maintaining its data rate. This voice packet 126 with the same data rate, is provided to the first packet terminal 110. However, in the presence of additional data to be transmitted to the first packet terminal 110, the first voice encoder 120 generates the voice packet 122 at a decreased rate. The first data inserter 124 inserts the additional data in the voice packet 122 and transmits the resulting voice packet 126 to the first packet terminal 110. The first packet terminal 110 converts the voice packet 122 to a PCM signal by using its voice decoding operation and outputs the PCM signal audibly to a user.

Regarding packet transmission and processing between the first packet terminal 110 and a second packet terminal 130, the first voice decoder 114 converts the voice packet 112 from the first packet terminal 110 to the PCM signal 116 and transmits the PCM signal 116 to a second voice encoder 136 through the network 100. As the PCM signal 116 passes through the network 100, it becomes a PCM signal 134. The second voice encoder 136 generates a voice packet 138 from the PCM signal 134 by using the same voice encoding scheme as used in the second packet terminal 130. A second data inserter 140 generates a voice packet 142 by inserting additional data in the voice packet 138 and transmits the voice packet 142 to the second packet terminal 130. Communications in the direction from the second packet terminal 130 to the first packet terminal 110 are conducted in substantially the same manner through a second voice decoder 132, the network 100, the first voice encoder 120, and the first data inserter 124.

As described above, coding-decoding is repeated in the process of input-coding-decoding-coding-decoding-output in a total single direction communication path. This is called Tandem Coding. In contrast, one coding-decoding is performed for communications between the first packet terminal 110 and the PSTN terminal 102.

While the typical system configuration illustrated in FIG. 1 is applicable to all communication environments, it suffers from communication quality degradation caused by information loss from repeated coding-decoding operations. To solve this problem, another system configuration has been developed and is illustrated in FIG. 2.

FIG. 2 illustrates the configuration of a typical voice packet forwarding system supporting packet bypass. As illustrated in FIG. 2, if first and second packet terminals 202 and 210 use the same type of vocoders, each of them can interpret voice packets received from the peer terminal. Hence, no particular processing is needed for packet transmission between the first and second packet terminals 202 and 210.

Referring to FIG. 2, a voice packet from the first packet terminal 202 is directly provided to a network 200 by use of a bypass 204. The network 200 forwards the voice packet to the peer party in substantially the same manner. The voice packet is output from the network 200 by use of a bypass 214. If the bypassed voice packet from the network 200 has a full rate and a second data inserter 216 is to insert additional data in the voice packet, the second data inserter 216 deletes voice information in the voice packet and forms a new voice packet with the additional data only by using a Blank and Burst method.

In the opposite direction, a voice packet from the second packet terminal 210 is directly provided to the network 200 by use of a bypass 212. The network 200 forwards the voice packet to a first data inserter 208 by use of a bypass 206. Similarly, the first data inserter 208 forwards the bypassed voice packet to the first packet terminal 202, or when needed, generates a new voice packet with additional data only, and transmits the new voice packet to the first packet terminal 202.

Since one coding-decoding is sufficient in the system illustrated in FIG. 2, voice quality is improved relative to that in the system of FIG. 1. Forwarding a voice packet without any further processing is called "Packet Bypass" or "Tandem-Free Operation".

Despite the benefit of improved voice quality between packet terminals, the above system has many constraints in its applicability. If the two packet terminals 202 and 210 use different kinds of vocoders, the Tandem-Free Operation is not viable. In addition, since Dim and Burst is used in the case of decreasing a packet rate to insert additional data during packet transmission, voice quality is decreased.

FIG. 3 illustrates the configuration of another typical voice packet forwarding system using a packet converter and a bypass instead of a voice decoder and a voice encoder.

Referring to FIG. 3, during communications from a first packet terminal 222 to a second packet terminal 230, a voice packet from the first packet terminal 222 is provided to a second packet converter 236 through a bypass 224 and a network 220. The second packet converter 236 converts the voice packet in substantially the same manner as used in a vocoder of the second packet terminal 230 or at a system-requested data rate. If data is to be inserted, a second data inserter 234 inserts the data in the converted voice packet. An empty space for the data insertion is prepared by the second packet converter 236. The voice packet from the second data inserter 234 is then forwarded to the second packet terminal 230.

In the opposite direction, a voice packet from the second packet terminal 230 is provided to the network 220 through a bypass 232. The network 220 forwards the voice packet to a first data inserter 228 through a first packet converter 226. The first data inserter 228, when needed, inserts additional data in the voice packet and provides it to the first packet terminal 222. An empty space for the data insertion is prepared by the first packet converter 226.

If the two terminals 222 and 230 use the same kind of vocoders and no rate conversion is required, the packet converters 226 and 236 function virtually as bypasses without any practical packet conversion. Voice packet forwarding performance is determined predominantly by the performance of the packet converters 226 and 236, and the tandem operation as illustrated in FIG. 1 is avoided. Therefore, the system of FIG. 3 outperforms that of FIG. 1. Furthermore, additional data transmission is possible in the Dim and Burst manner by using rate conversion in the packet converters 226 and 236.

However, voice packet conversion involves re-search or quantization of many voice parameters that determine the characteristics of an input voice signal beyond simple bit reordering or format conversion. Therefore, the voice packet conversion requires very complex mathematical computations.

In this regard, the above-described voice packet forwarding methods have their own drawbacks. The communication system illustrated in FIG. 1 is most typical and applicable to any communication environment, but faces the problem of voice quality degradation caused by tandem coding. Despite increased voice quality through voice packet bypass compared to the communication system of FIG. 1, the applicability of the communication system illustrated in FIG. 2 is limited to an environment where two terminals use the same kind of vocoders. In addition, when additional data such as a control/signaling message is generated, voice quality is decreased because of the Blank and Burst method used.

While the system illustrated in FIG. 3 is effective in solving the problems of the systems illustrated in FIGS. 1 and 2, packet conversion is performed on all possible combinations of different voice packets for every kind of vocoder available for communications, and rate conversion is also needed for each variable-rate vocoder. Moreover, in the case of using a new kind of vocoder, the system configuration and operation needs to be modified to support packet conversion between the new kind of vocoder and every existing vocoder.

Once one of the schemes illustrated in FIGS. 1, 2 and 3 is chosen at a call connection according to a communication environment, the chosen scheme is kept unchanged during the call. That is, the voice packet forwarding schemes are mutually independent without compatibility between them. However, it may occur that a communication environment for a packet terminal is changed during a call due to handoff in mobile communications, for example, such that the type of vocoder is changed or the data rate of a channel is restricted. In this case, the use of the above described technology brings distinctive interruptions when the environment is changed, thereby decreasing voice quality and creating noise.

Accordingly, there exists a need for developing a voice packet forwarding system and method that ensures excellent performance against frequent changes in communication environments.

SUMMARY OF THE INVENTION

An object of the present invention is to substantially solve at least the above and other problems and/or disadvantages, and to provide at least the advantages below. Accordingly, embodiments of the present invention provide an apparatus and method for forwarding voice packets and supporting voice packet conversion required for the voice packet forwarding by introducing an integrated configuration and concept in a communication environment where different types of communication terminals and different types of vocoders are used and various forms of connections are provided.

Embodiments of the present invention provide an apparatus and method for forwarding and processing voice packets, which are commonly applicable to substantially every communication environment and ensure optimum performance in substantially every communication environment in a digital communication system.

Embodiments of the present invention also provide an apparatus and method for forwarding and processing voice packets, which can support substantially every communication environment by using an integrated system configuration.

Embodiments of the present invention also provide an apparatus and method for forwarding and processing voice packets, which ensure excellent performance against frequency environmental changes by setting a communication environment on a frame basis of a vocoder.

Embodiments of the present invention also provide an apparatus and method for forwarding and processing voice packets, which enable optimal voice packet forwarding and processing according to a communication environment, utilizing the functions of an existing voice encoder and decoder, without the need for developing a novel packet processing module.

According to one aspect of the present invention, in a voice packet forwarding apparatus in a digital communication system, a switched vocoder module is provided and directly passes a voice packet received from a packet terminal to a digital communication network, or a PCM signal decoded from the voice packet to the digital communication network, and directly passes a voice packet received from the digital communication network to the packet terminal, converts the voice packet and transmits the changed voice packet to the packet terminal, or transmits a voice packet coded from a PCM signal received from the digital communication network. Here, the packet terminal is able to communicate with another packet terminal or a PSTN terminal over the digital communication network. A data inserter, in the presence of additional data to be transmitted to the packet terminal, is provided and inserts the additional data in the voice packet received from the switched vocoder module and transmits the voice packet with the additional data to the packet terminal. A controller is provided and controls the switched vocoder module and the data inserter. The switched vocoder module comprises a voice encoder for generating the voice packet by encoding the received PCM signal, a voice decoder for generating the PCM signal by decoding the received voice packet, and a plurality of switches for connecting inputs and outputs of the digital communication network, the packet terminal, the voice decoder, and the voice encoder.

According to another aspect of the present invention, in a method of forwarding and processing a voice packet to connect a packet terminal to a digital communication network in a digital communication system, the packet terminal being capable of communicating with another packet terminal or a PSTN terminal over the digital communication network, it is determined whether communications with the digital communication network are PCM interfacing or packet interfacing. If the communications with the digital communication network are PCM interfacing, a voice packet received from the packet terminal is decoded to a PCM signal by a voice decoder and transmitted to the network, and a PCM signal received from the digital communication network is encoded to a voice packet by a voice encoder and transmitted to the packet terminal. If the communications with the digital communication network are packet interfacing, it is determined whether packet bypass is possible. If the packet bypass is possible, the voice packet received from the packet terminal is passed directly to the digital communication network and the voice packet received from the digital communication network is passed directly to the packet terminal. If the packet bypass is not possible, the voice packet received from the packet terminal is transmitted to the digital communication network, decoded to the PCM signal by the voice decoder, encoded to the voice packet by the voice encoder, and transmitted to the packet terminal. In the presence of a message to be transmitted to the packet terminal, the message is inserted into the directly passed voice packet or the voice packet coded from the decoded PCM signal.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described herein below with reference to the accompanying drawings. In the following description, well-known functions or constructions are not described in detail since they would obscure the invention in unnecessary detail.

Figure 1:
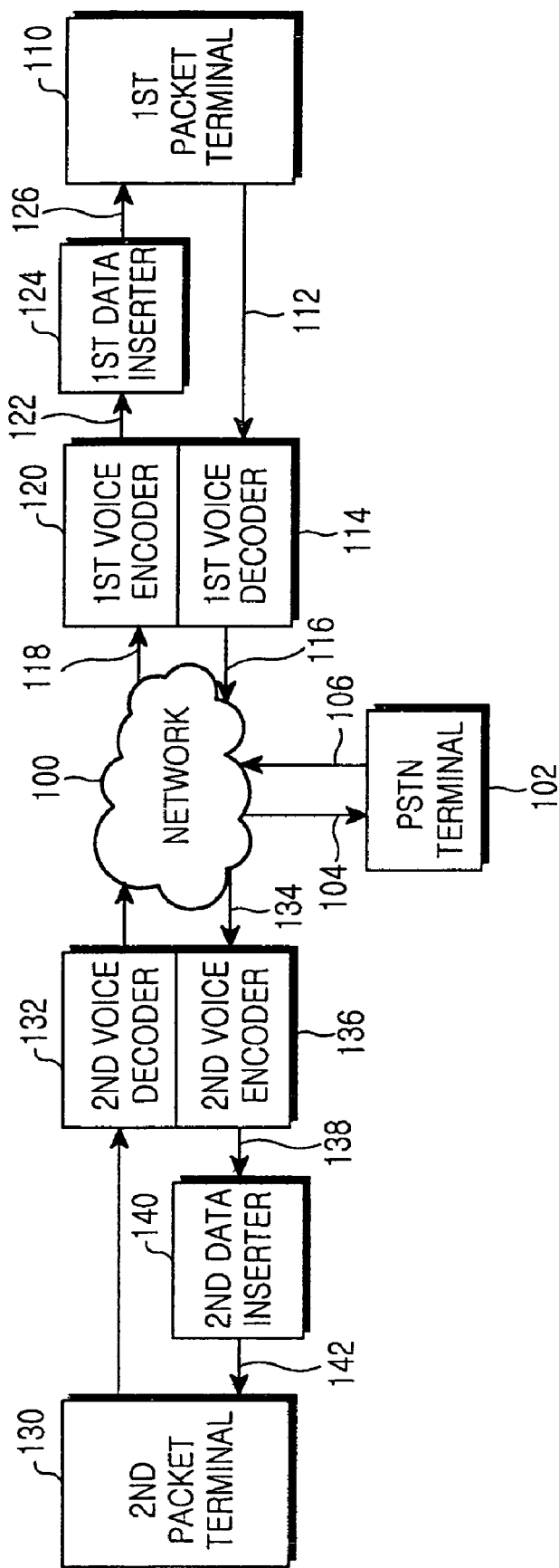
FIG. 1 illustrates the configuration of a typical PSTN-based voice packet forwarding system.
Figure 2:
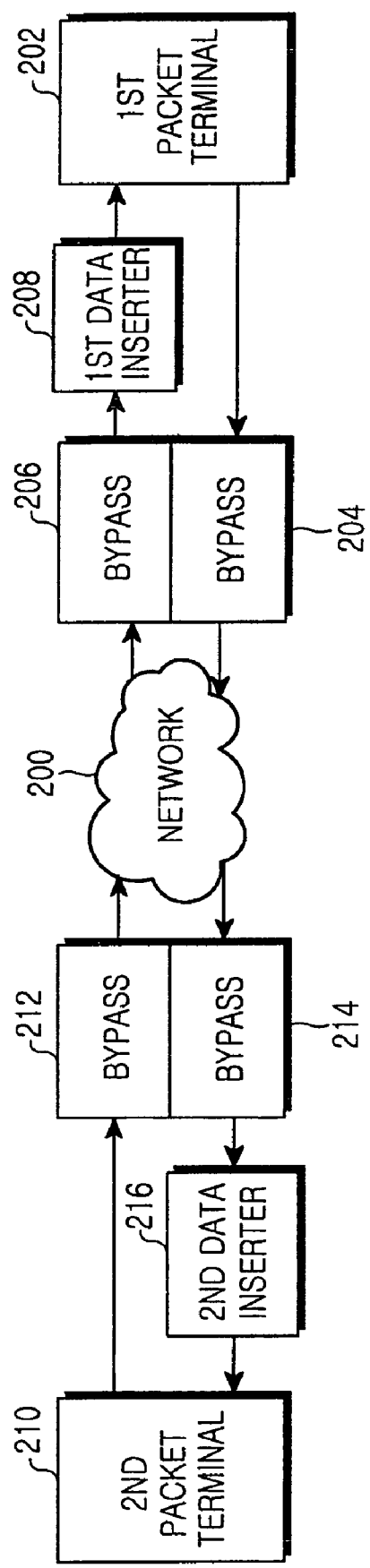
FIG. 2 illustrates the configuration of a typical voice packet forwarding system supporting packet bypass.
Figure 3:
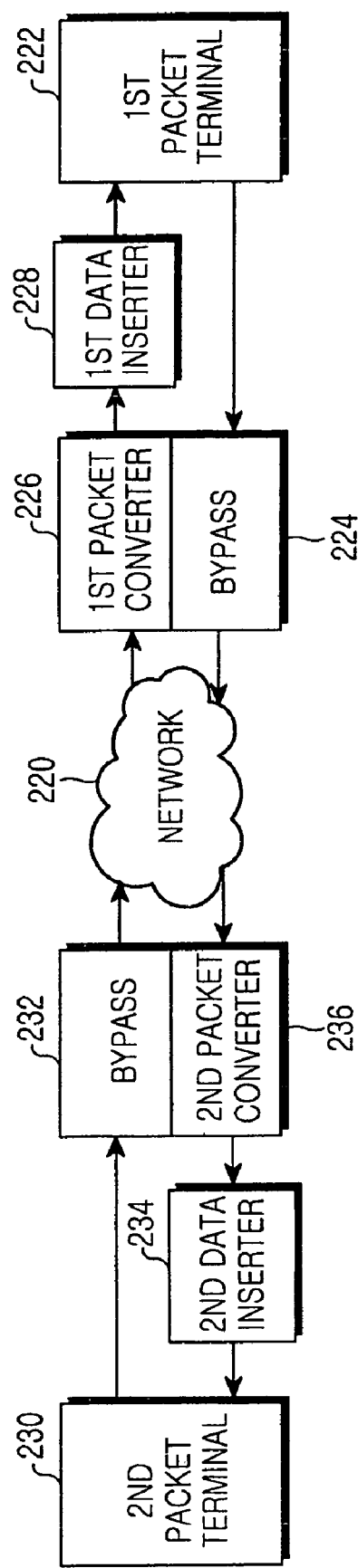
FIG. 3 illustrates the configuration of another typical voice packet forwarding system using a packet converter and a bypass instead of a voice decoder and a voice encoder.
Figure 4:
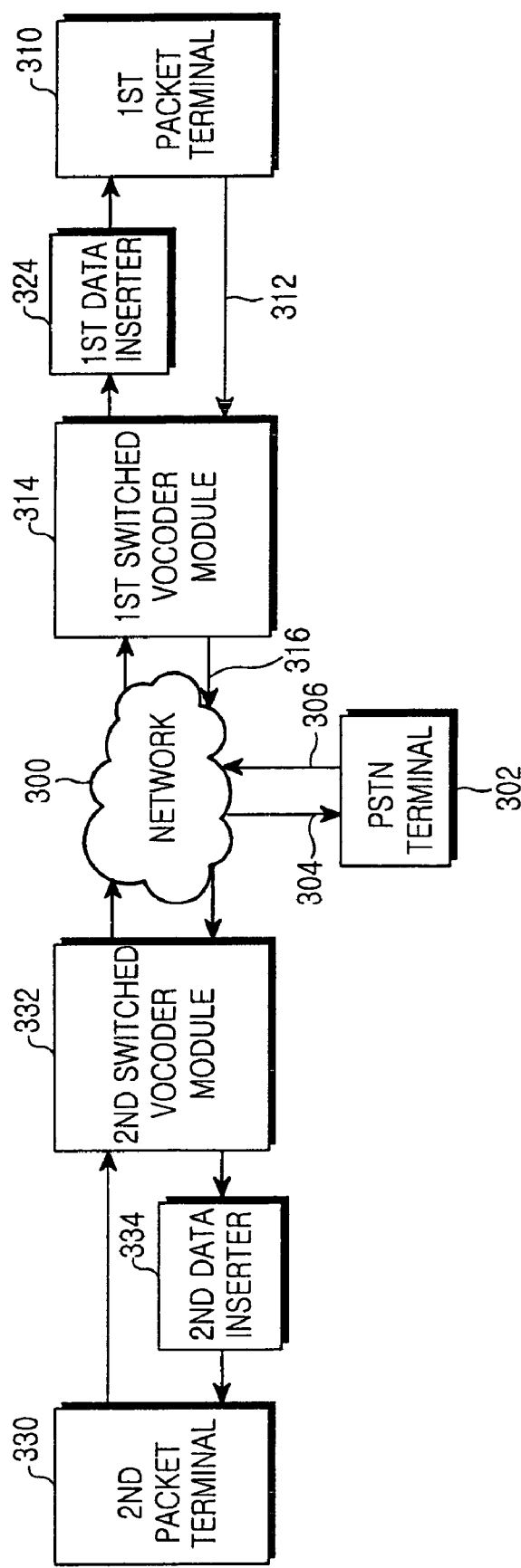
FIG. 4 illustrates a configuration of a voice packet forwarding system according to an exemplary embodiment of the present invention.

FIG. 4 illustrates a configuration of a voice packet forwarding system according to an exemplary embodiment of the present invention. Referring to FIG. 4, first and second packet terminals 310 and 330 and a PSTN terminal 302, are connected to a digital communication network 300 for communications. Particularly, connections are made between the packet terminals 310 and 330 and the network 300 through first and second switched vocoder modules 314 and 332, respectively, that are capable of voice coding and decoding. The switched vocoder modules 314 and 332 provide improved performance by realizing optimal communications on a frame basis according to a communication environment. A frame can be defined, for example, as a minimum unit of voice coding/decoding, that is, unit data or a unit time interval corresponding to unit data.

In operation, at a call setup between the first packet terminal 310 and the PSTN terminal 302, the first packet terminal 310 converts an input voice signal to a voice packet 312 by using its internal voice encoder. The first switched vocoder module 314 creates a PCM voice signal 316 with the voice packet 312 by using the same voice decoding as used in the first packet terminal 310. The network 300 converts the PCM voice signal 316 to an analog signal 304 by using its internal PSTN switch (not shown) and forwards the analog signal 304 to the PSTN 302. In this way, voice from the first packet terminal 310 is transmitted to the PSTN terminal 302.

The PSTN switch of the network 300 converts an analog signal 306 received from the PSTN terminal 302 to a PCM signal. The first switched vocoder module 314 converts the PCM signal to a voice packet of the same kind as used in the vocoder of the first packet terminal 310.

If there is no need for inserting additional data such as a control/signaling message or a short message, the first switched vocoder module 314 creates the voice packet by encoding the PCM signal from the network 300 at a full rate. The voice packet is forwarded to the first packet terminal 310, bypassing a first data inserter 324. However, in the presence of additional data to be inserted, the first switched vocoder module 314 creates a voice packet by encoding the PCM signal at a lower rate than the full rate. The first data inserter 324 inserts the additional data in the voice packet and transmits the resulting voice packet to the first packet terminal 310. The low rate is determined such that a space large enough to accommodate the additional data is spared from the voice packet according to the size of the additional data. The voice decoder of the first packet terminal 310 converts the received voice packet to a PCM signal and outputs the PCM signal in an audible form to a user.

Now a description will be made of exemplary packet forwarding and processing for communications between the first and second packet terminals 310 and 330.

The first switched vocoder module 314 simply passes a voice packet from the first packet terminal 310 to the network 300. The network 300 forwards the voice packet to the second switched vocoder module 332. The second switched vocoder module 332 simply passes the voice packet to the second packet terminal 330. When needed, the second switched vocoder module 332 converts the received voice packet, and a second data inserter 334 inserts additional data in the converted voice packet and transmits the resulting voice packet to the second packet terminal 330. Communications from the second packet terminal 330 to the first packet terminal 310 are conducted in substantially the same manner.

As described above, the first and second switched vocoder modules 314 and 332 substitute for vocoders, bypasses, and packet converters that operate separately according to different communication environments. Advantageously, the switched vocoder modules 314 and 332 each have a simple configuration comprising a voice encoder, a voice decoder, a plurality of switches, and a controller.

Figure 5:
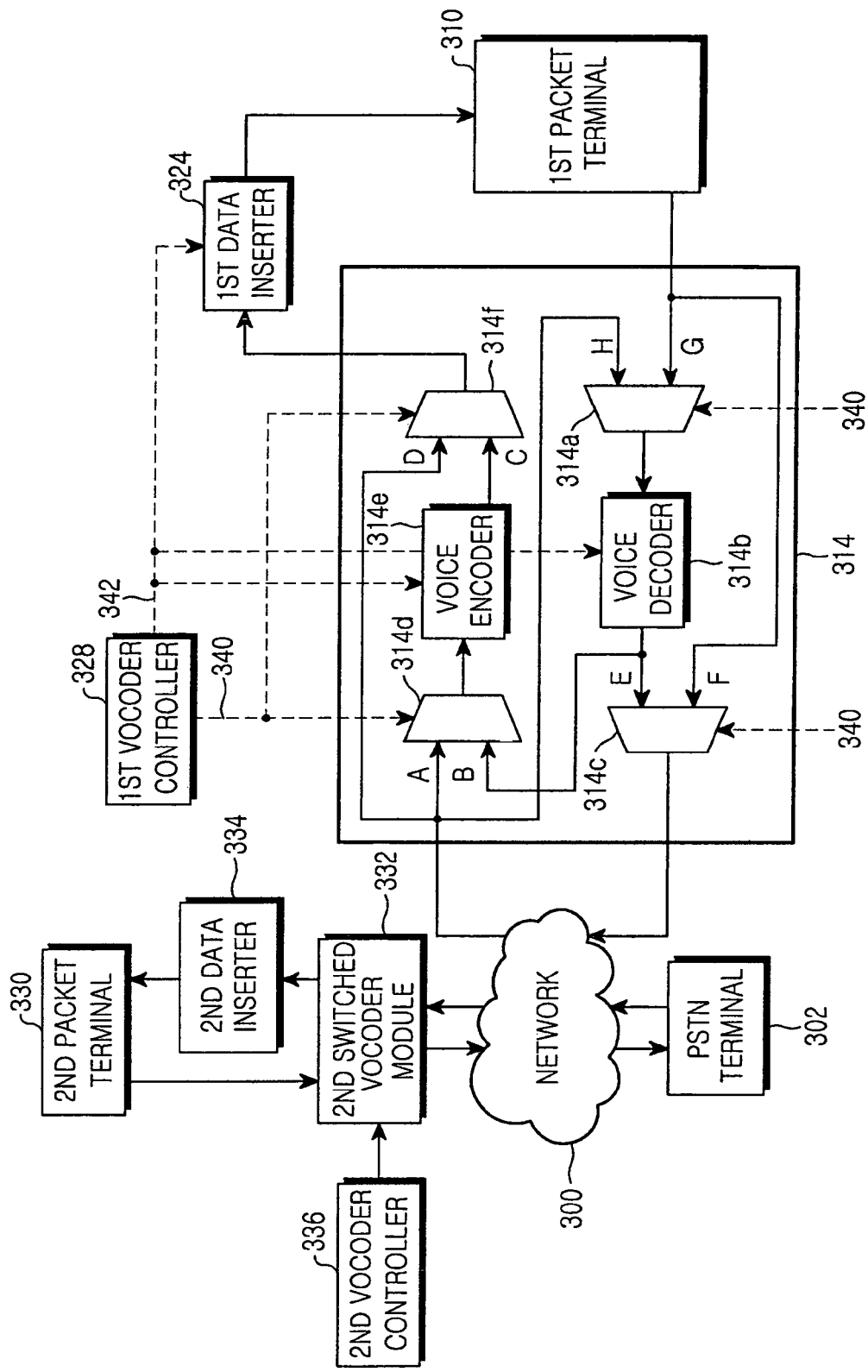
FIG. 5 is a detailed block diagram of a switched vocoder module according to an exemplary embodiment of the present invention.

FIG. 5 is a detailed block diagram of the switched vocoder modules 314 and 332 according to an exemplary embodiment of the present invention. While the first and second vocoder controllers 328 and 336 are provided separately from the first and second switched vocoder modules 314 and 332, it can be further contemplated as another embodiment of the present invention that the vocoder controllers 328 and 336 are incorporated in the switched vocoder modules 314 and 332, respectively. Since the switched vocoder modules 314 and 332 are substantially identical in configuration and operation, and vocoder controllers 328 and 336 are substantially identical in configuration and operation, only the first switched vocoder module 314 and the first vocoder controller 328 connected to the first packet terminal 310 will be described by way of example.

The first switched vocoder module 314 comprises a voice encoder 314e for converting a PCM signal to a voice packet, a voice decoder 314b for converting a voice packet to a PCM signal, and a plurality of switches 314a, 314c, 314d and 314f for selecting the input and output signals of the voice encoder 314e and the voice decoder 314b. The first vocoder controller 328 collects information about communications between the first and second packet terminals 310 and 330, and outputs a switch control signal 340 for controlling the switches 314a, 314c, 314d and 314f, and a data insertion control signal 342 for controlling the voice encoder 314e and the voice decoder 314b, thereby controlling the switched vocoder module 314 and the first data inserter 324. While not shown, the vocoder controller 328 can be divided into a switch controller and a vocoder controller in another embodiment of the present invention.

The voice encoder 314e and the voice decoder 314b support PCM-based and packet-based connectivity to the network 300. Embodiments of the present invention can be based on the assumption that a connection standard in correspondence to a communication environment is automatically used, and that there are no limits in connection standards, but is not limited thereto. A connection between the vocoder 314e and 314b and the packet terminal is established via a packet-based channel. The first packet terminal 310 also comprises a vocoder with a voice encoder and a voice decoder and transmits/receives voice packets.

In an exemplary operation, when the two terminals 310 and 302, or 310 and 330, access the network 300 and thus are connected to each other, the first vocoder controller 328 determines a control function in relation to communications by comprehensively analyzing the characteristics of the two terminals, the need for transmitting additional data, information about voice communications, and other communication information. The first vocoder controller 328 analyzes a communication situation frame by frame and provides corresponding communication information. The communication information analyzed contains the types of the terminals, the types of vocoders in the terminals, information about whether additional information such as a control/signaling message is to be transmitted, and an allowed rate for an output channel. According to the communication information, communication environments are divided largely into three exemplary modes, but are not limited thereto.

For example, the first vocoder controller 328 can receive communication information about the terminals 310, 330 and 302 from switching systems (not shown) or access networks (not shown) that serve the terminals. Since the paths and means by which the first vocoder controller 328 receives the communication information are beyond the scope of embodiments of the present invention, their detailed description is not provided herein.

In mode 1, voice is transmitted in the form of a PCM signal between the vocoder 314e and 314b and the network 300, like communications between the packet terminal 310 and the PSTN terminal 302. Voice transmission in the form of a packet between the vocoder 314e and 314b and the network 300 corresponds to mode 2. An example of mode 2 is a mobile-to-mobile call between the packet terminals 310 and 330. Mode 3 is a special case of mode 2. This is the case where a call can be conducted by simply transmitting voice packets between the two packet terminals 310 and 330 in the communication system. If the two packet terminals 310 and 330 use the same kind of vocoders and there is no need for changing packet rate during transmission, communications are made in mode 3. However, if packet rate needs to be decreased for transmission of additional data even though the same type of vocoders are used, this case corresponds to mode 2. In the case where the terminals 310 and 330 use the same kind of vocoders and packet rate is limited due to transmission of additional data, communications are made in mode 3 as far as the rate of an input voice packet is not higher than the rate limit.

At a call connection, the first vocoder controller 328 determines a mode by comprehensively analyzing a given communication situation, determines the type and operation of the vocoder 314e and 314b according to the mode, and correspondingly controls the operations of the switches 314a, 314c, 314d and 314f. The control operation is performed on a frame basis.

In mode 1, the voice encoder 314e and the voice decoder 314b are set to operate in the same manner as those of the first packet terminal 310. In mode 2 and mode 3, the voice encoder 314e is set to operate in the same manner as the voice decoder of the first packet terminal 310, and the voice decoder 314b is set to operate in the same manner as the voice encoder of the second packet terminal 330.

Control of the voice encoder 314e and the voice decoder 314b can involve setting a maximum allowed rate for the voice encoder 314e, noise cancellation and pre-filtering of the voice encoder 314e, post-filtering of the voice decoder 314b, and changing a coding weight parameter for the voice encoder 314e. The first vocoder controller 328 adjusts different parameters for different modes. For instance, the first vocoder controller 328 excludes noise cancellation in the voice encoder 314e and post-filtering in the voice decoder 314b in mode 2 and mode 3. In mode 3, the first vocoder controller 328 can reduce computation volume by simplifying the search operation of the voice encoder 314e and the voice decoder 314b. In order to avoid signal discontinuity at a mode change, the first vocoder controller 328 can create a time delay during voice coding and decoding in each mode. The control of the voice encoder 314e and the voice decoder 314b can be changed according to a voice coding algorithm used and thus, its detailed operation is not provided herein.

The first vocoder controller 328 controls switching on a frame basis according to received communication information and outputs commands to the switches 314a, 314c, 314d and 314f. In the illustrated case of FIG. 5, the first and second switches 314d and 314f determine the input and output to and from the voice encoder 314e, respectively, and the third and fourth switches 314a and 314c determine the input and output to and from the voice decoder 314b, respectively.

Figure 6A:
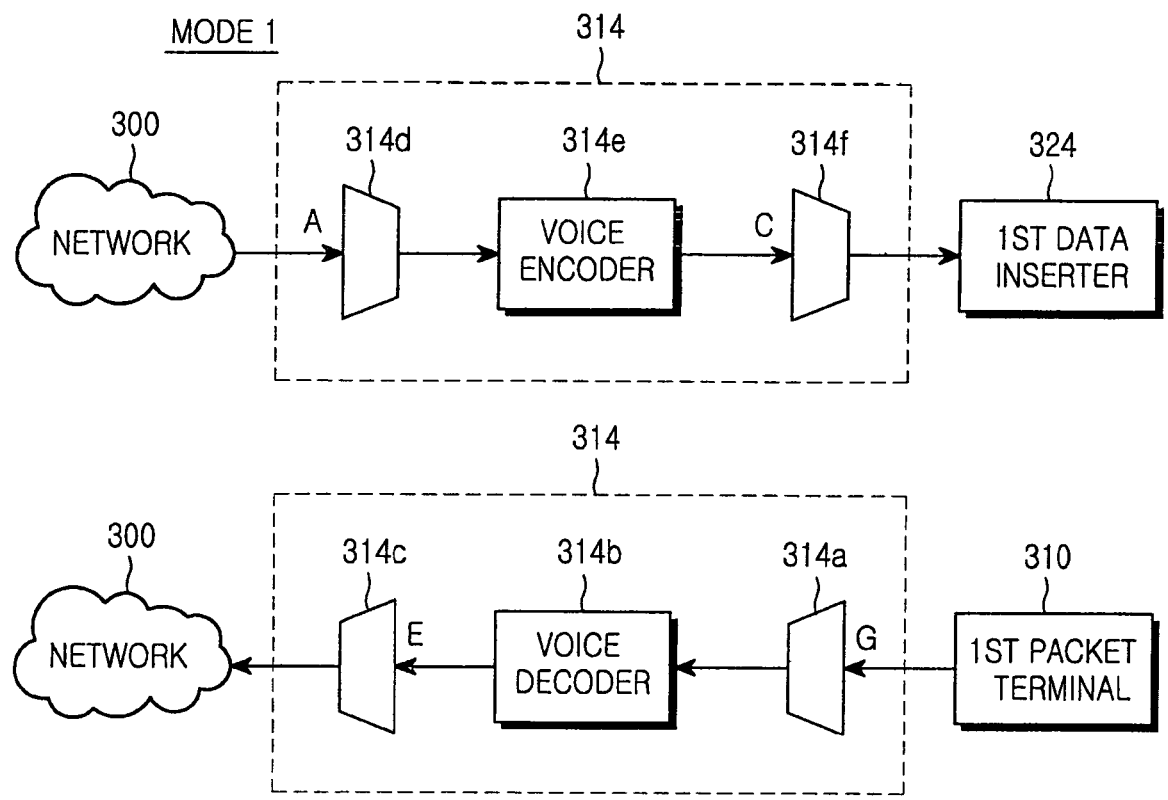
FIGS. 6A, 6B and 6C illustrate voice packet forwarding operations in exemplary mode 1, mode 2, and mode 3, respectively, according to an embodiment of the present invention.
Figure 6B:
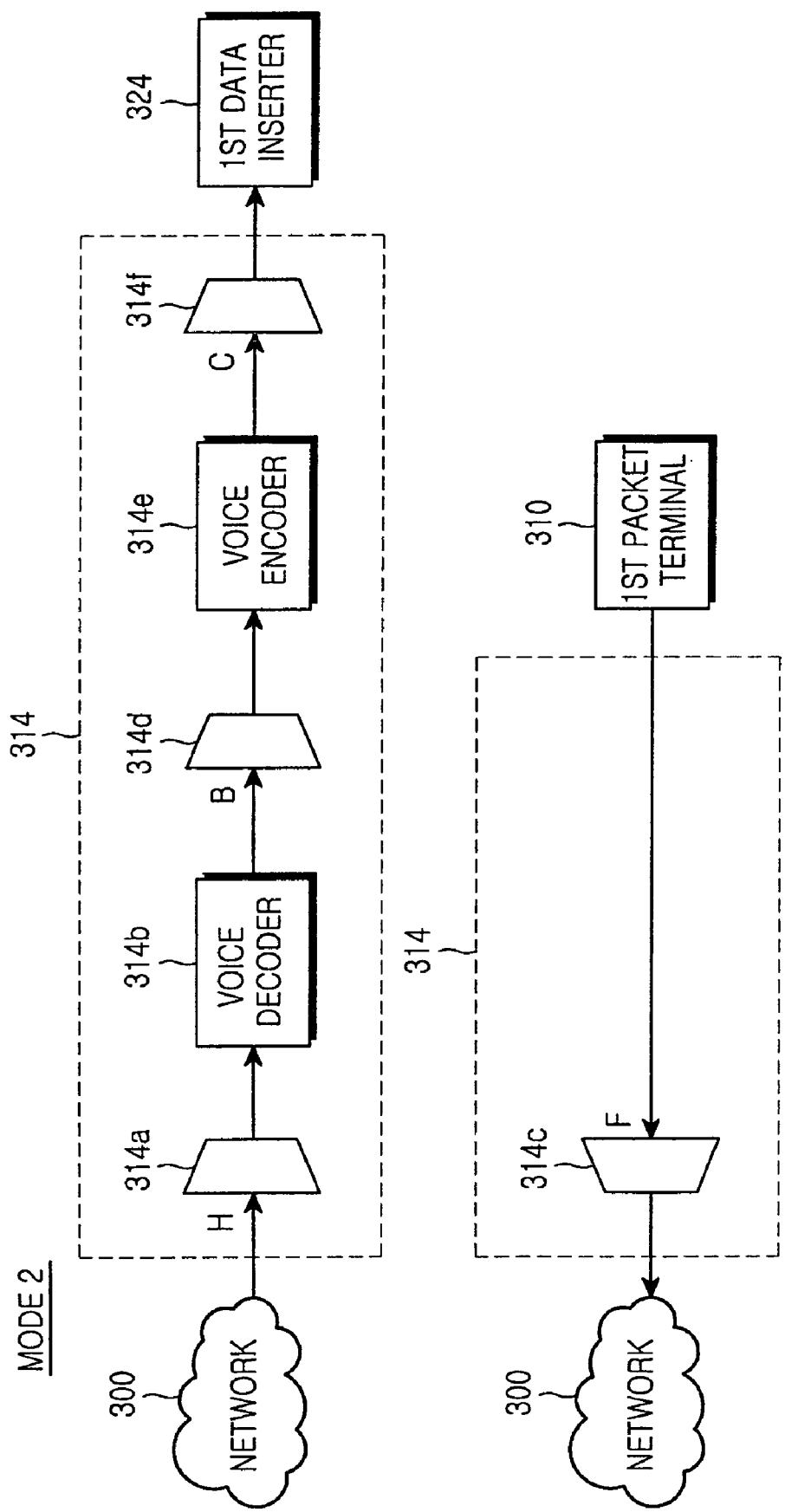
Figure 6C:
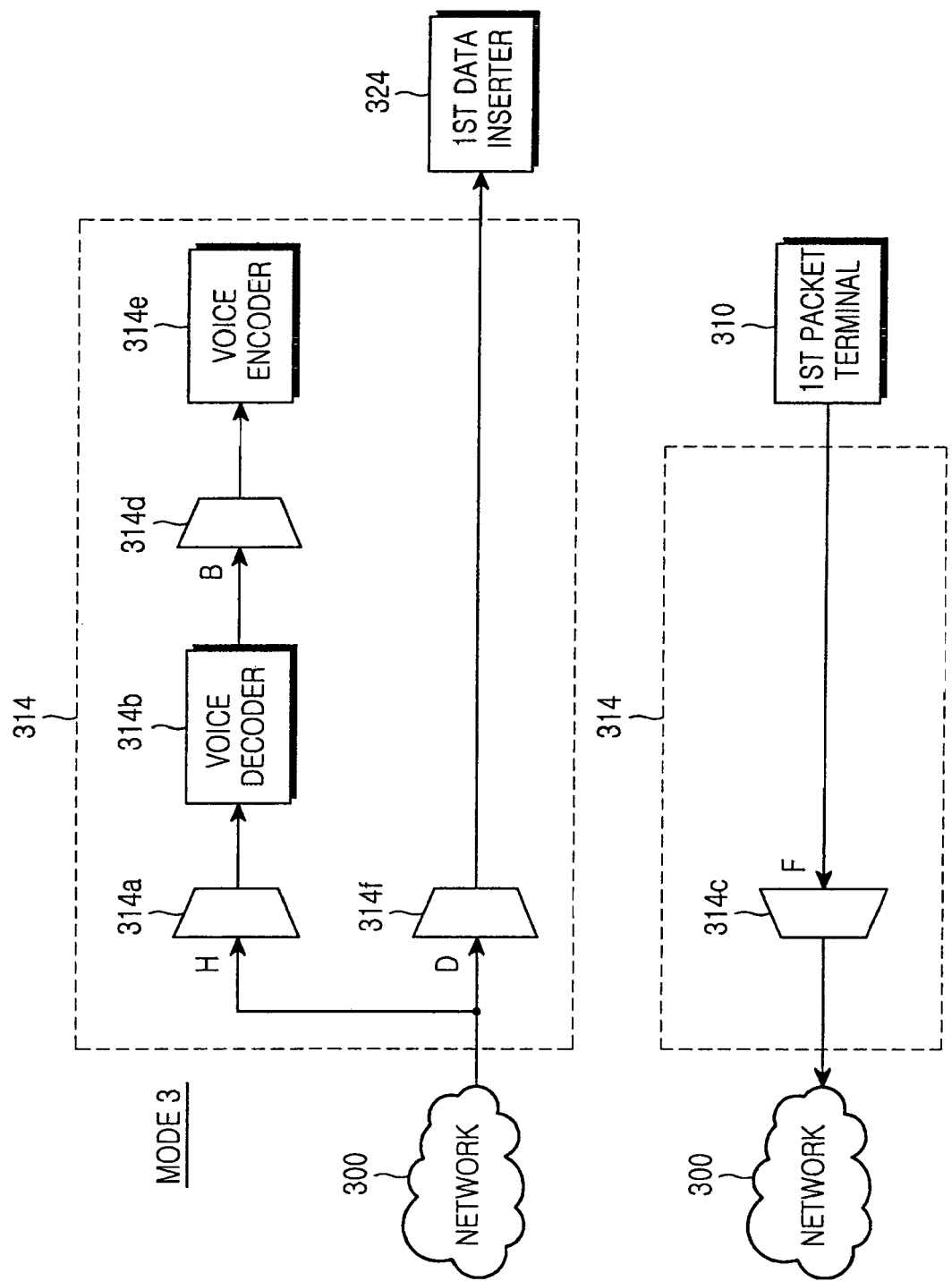

FIGS. 6A, 6B and 6C illustrate exemplary switching of the switches 314a, 314c, 314d and 314f in mode 1, mode 2, and mode 3, respectively.

Referring to FIG. 6A, in mode 1, the first switch 314d switches a PCM signal received from the network 300 to the voice encoder 314e and the second switch 314f switches a voice packet generated from the voice encoder 314e to the first data inserter 324. The third switch 314a switches a voice packet received from the first packet terminal 310 to the voice decoder 314b and the fourth switch 314c switches a PCM signal generated from the voice decoder 314b to the network 300.

Referring to FIG. 6B, in mode 2, the third switch 314a switches a voice packet received from the network 300 to the voice decoder 314b, and the first switch 314d switches a PCM signal generated from the voice decoder 314b to the voice encoder 314e. The second switch 314f switches a voice packet generated from the voice encoder 314e to the first data inserter 324, and the fourth switch 314c switches a voice packet directly received from the packet terminal 310 to the network 300.

Referring to FIG. 6C, the switches 314a, 314c, 314d and 314f operate in mode 3 basically in substantially the same manner as in mode 2, except that a bypass function is performed in mode 3 to avoid voice quality degradation caused by tandem coding. Specifically, the second switch 314f simply passes a voice packet received from the network 300 to the first data inserter 324. At the same time, the third switch 314a switches the voice packet from the network 300 to the voice decoder 314b, and the first switch 314d can switch a PCM signal generated from the voice decoder 314b to the voice encoder 314e. While the voice encoder 314e generates a voice packet by encoding the PCM signal generated from the voice decoder 314b, the voice packet is not provided to the first data inserter 324. These operations of the voice decoder 314b and the voice encoder 314e are performed to update their internal states for the purpose of ensuring the continuous operation of the voice encoder 314e against a mode change. The updating is required due to the characteristics of a voice coding algorithm utilizing a previous voice signal.

The operation of the above voice packet forwarding and processing system will now be described in the context of CDMA digital mobile communications.

In CDMA mobile communications, the first terminal 310 corresponding to a cellular phone and the third terminal 302 corresponding to a Plain Old Telephone (POT) phone communicate with each other always in mode 1. The first vocoder controller 328 restricts the maximum rate of an output voice packet in a frame delivering additionally a message to ½, and supports transmission of the additional data by Dim and Burst. If the type of vocoder in the first terminal 310 is changed during the call, associated information is provided to the first vocoder controller 328, and the first vocoder controller 328 controls the voice encoder 314*e* and the voice decoder 314*b* to operate in the substantially same manner as the vocoder of the first terminal 310 by transmitting a command.

In one of mode 1, mode 2 and mode 3, communications are made between the first and second terminals 310 and 330 corresponding to cellular phones in CDMA digital mobile communications. While mode 1 and mode 2 are basically available for a call, it is preferable to introduce packet bypass to mode 1 and mode 2 in order to prevent tandem coding-caused voice quality degradation. The basic concept of mode determination in the first vocoder controller 328 is as follows.

The first vocoder controller 328 basically uses tandem coding and, in a special case, it applies packet bypass in mode 3. In this case, frequent transition is required between the tandem coding and the packet bypass. The voice encoder 314*e* and the voice decoder 314*b* ensure more stable performance in transitions between mode 2 and mode 3 using the same input signal. That is, although the voice encoder 314*e* and the voice decoder 314*b* receive different signals in mode 1 and mode 3, the same input is used in mode 2 and mode 3. Therefore, no discontinuity is observed in the operations of the voice encoder 314*e* and the voice decoder 314*b*, thereby preventing performance degradation.

Hence, communications are made between the terminals 310 and 330 basically in mode 2. According to the rates of the terminals 310 and 330, or according to a maximum rate determined depending on whether additional data is to be transmitted, the voice encoder 314*e* is controlled for message transmission in Dim and Burst. If the condition of the same vocoders in the two terminals 310 and 330 and no packet conversion is fulfilled during a mode 2 operation, mode 2 is transitioned to mode 3. If the condition is not fulfilled during the mode 3 operation, mode 3 is returned to mode 2. During which time, the voice encoder 314*e* and the voice decoder 314*b* operate normally to guarantee operation continuity for the voice encoder 314*e* and the voice decoder 314*b* for the case of returning to mode 2. If the type of the vocoder of either of the terminals is changed due to a handoff during a call, the first vocoder controller 328 selects mode 2 or mode 3 according to the type of the changed vocoder.

Therefore, when the two terminals 310 and 330 use the same kind of vocoders in CDMA mobile communications, a frame delivering an additional message is forwarded in mode 2 and any other general frame is forwarded in mode 3. In the former case, the frame is very simply processed by data insertion of the first data inserter 324 in the Dim and Burst manner, whereas in the latter case, voice quality is improved for the general frame through packet bypass. The voice packet forwarding apparatus of embodiments of the present invention significantly improves communication quality by supporting both packet bypass and Dim and Burst without adding a complex module.

In the case where the two terminals 310 and 330 use different types of vocoders, they communicate in mode 2. If the type of the vocoder in either of the terminals is changed due to a handoff during a call and thus, the vocoders of the terminals become identical in type, mode 2 is transitioned to mode 3 in the middle of the call, thereby achieving performance improvement through packet bypass. Even though handoff occurs frequently at a cell boundary in the mobile communication system, communications are made without interruptions by transitions between mode 2 and mode 3.

Figure 7:
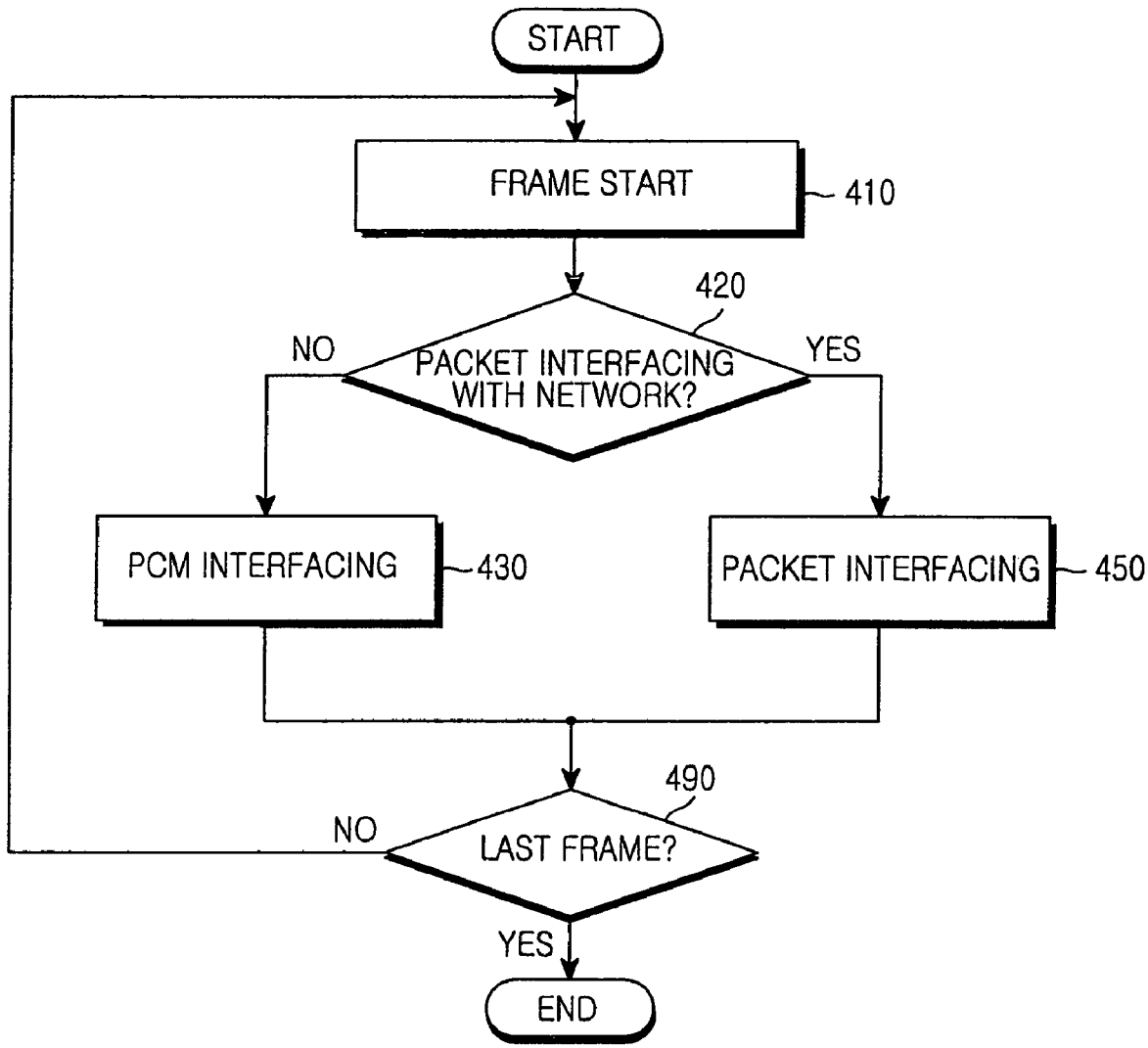
FIG. 7 is a flowchart illustrating a voice packet forwarding operation according to an exemplary embodiment of the present invention.

FIG. 7 is a flowchart illustrating a voice packet forwarding operation and processing according to an exemplary embodiment of the present invention. A call setup for starting a call and a call release for ending the call in a digital communication system are not described herein because they are beyond the scope of the present invention. Communication signals are transmitted/received on a frame basis in the exemplary embodiment of the present invention described in FIG. 7, but are not limited thereto.

Referring to FIG. 7, the vocoder controller recognizes the start of a frame in step 410 and determines whether communications are conducted between the switched vocoder module and the network on a packet basis in step 420. In the case of non-packet-based communications, that is, PCM-based communications, the vocoder controller performs PCM interfacing by using a control operation in mode 1 in step 430. For example, the vocoder controller connects the first to fourth switches 314*d*, 314*f*, 314*a* and 314*c* to inputs A, C, G and E, respectively as shown in FIG. 6A.

In the case of packet-based communications, the vocoder controller performs packet interfacing by using a control operation in mode 2 or mode 3 in step 450. For example, the vocoder controller connects the first to fourth switches 314*d*, 314*f*, 314*a* and 314*c* to inputs B, C or D, H and F, respectively, as shown in FIGS. 6B and 6C. The vocoder controller selects the input C or D depending on whether packet bypass is available or not.

In step 490, the vocoder controller determines whether the current frame is the last one and if so, the call is terminated. If the call still proceeds, the vocoder controller returns to step 410 to process the next frame. If the call is terminated, the vocoder controller ends the procedure.

Figure 8A:
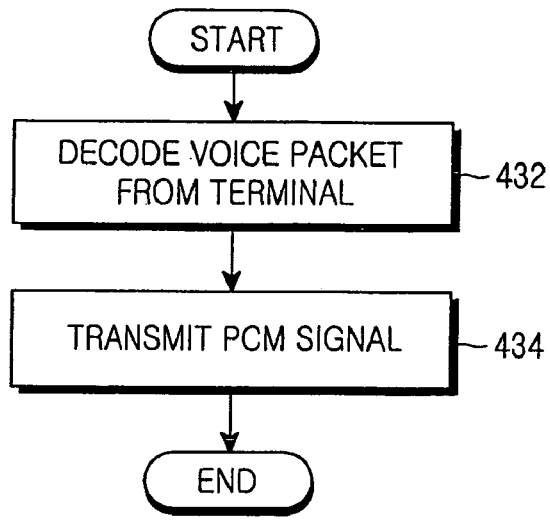
FIGS. 8A and 8B are detailed flowcharts illustrating a PCM interfacing operation according to an exemplary embodiment of the present invention.
Figure 8B:
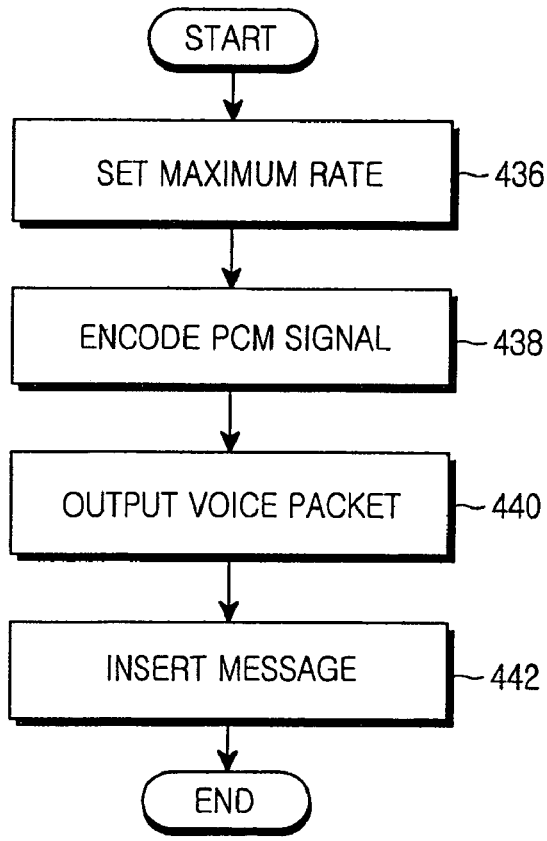

FIGS. 8A and 8B are detailed flowcharts illustrating the PCM interfacing operation of step 430 according to an exemplary embodiment of the present invention.

Referring to FIG. 8A, the voice decoder decodes a voice packet received from the terminal and outputs the resulting PCM signal in step 432. In step 434, the PCM signal is forwarded to the network.

Referring to FIG. 8B, the vocoder controller determines a maximum allowed rate for the voice encoder by checking whether additional data is to be transmitted in step 436. If there is no need for transmitting the additional data, an available maximum rate is selected. If the additional data needs to be transmitted, a lower rate is selected to spare a space that is large enough to accommodate the message. The voice encoder generates a voice packet by encoding the PCM signal received from the network at the determined rate in step 438, and transmits the voice packet to the data inserter in step 440. If the additional data is to be transmitted, the message is inserted into the voice packet and then transmitted to the peer terminal in step 442.

Figure 9A:
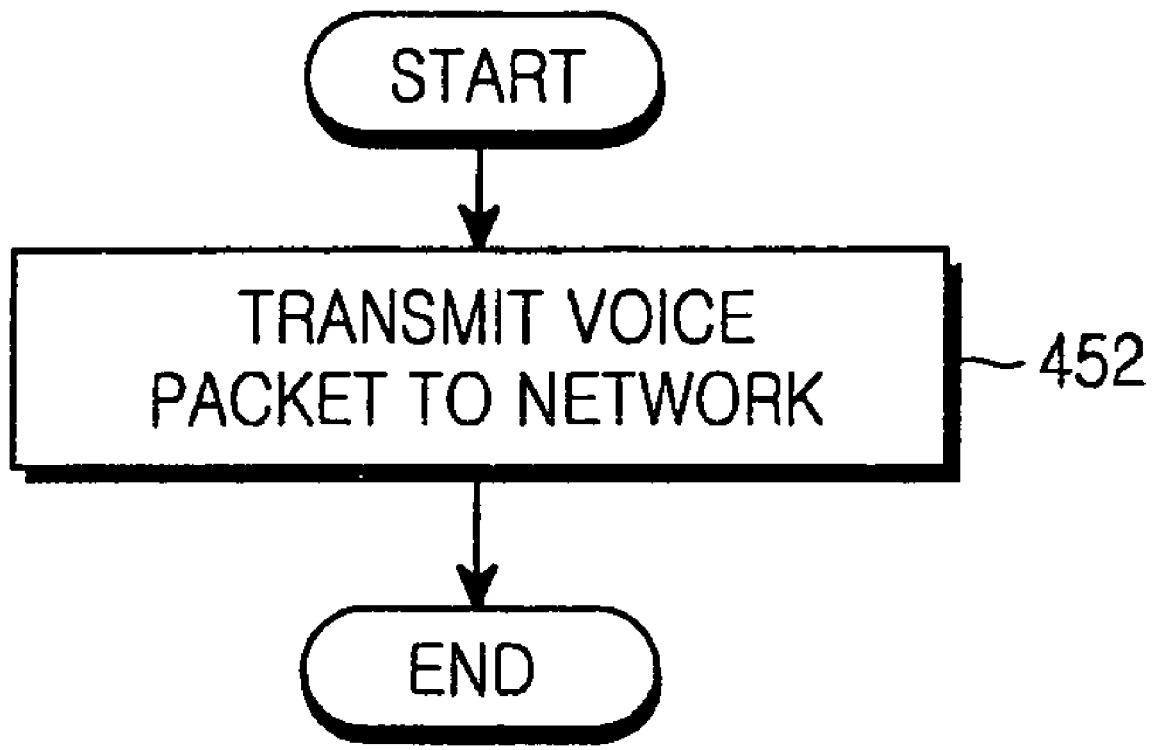
FIGS. 9A and 9B are detailed flowcharts illustrating a packet interfacing operation according to an exemplary embodiment of the present invention.
Figure 9B:
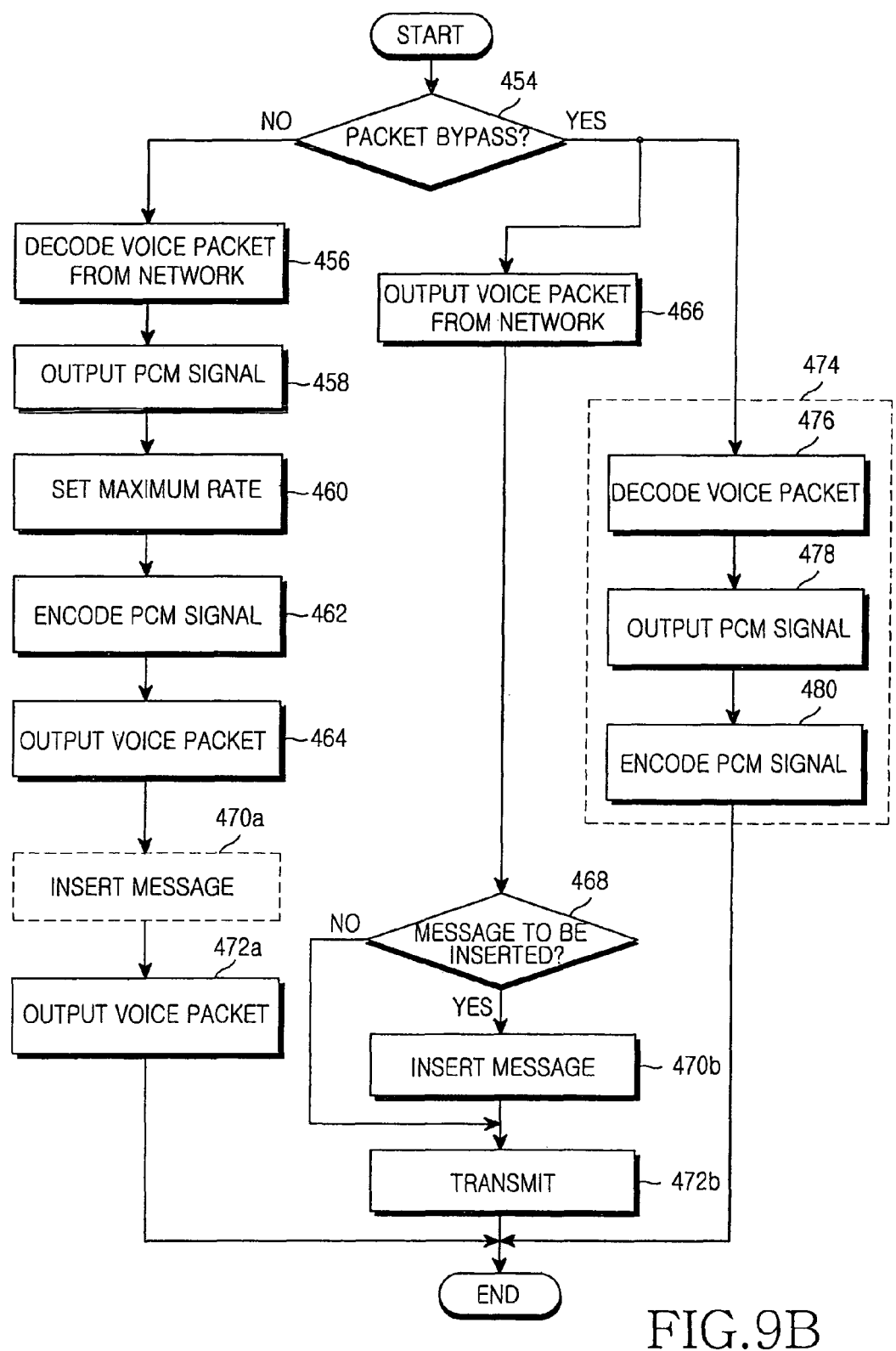

FIGS. 9A and 9B are detailed flowcharts illustrating the packet interfacing operation of step 450 according to an exemplary embodiment of the present invention.

Referring to FIG. 9A, a voice packet from the terminal is directly transmitted to the network in step 452.

Referring to FIG. 9B, the vocoder controller compares the vocoder of the terminal with that of the peer terminal and determines whether packet bypass is available according to the presence or absence of additional data to be transmitted to the peer terminal in step 454. If the vocoders are of the same type and no additional data is to be transmitted, or if a space to accommodate the additional data is already spared in the voice packet received from the network, the vocoder controller determines that packet bypass is available.

If packet bypass is not available, the voice decoder decodes the voice packet received from the network to a PCM signal in step 456, and outputs it to the voice encoder in step 458. In step 460, the vocoder controller determines a maximum rate for the voice encoder according to the presence or absence of the additional data. The voice encoder encodes the PCM signal received from the voice decoder to a voice packet at the determined rate in step 462, and transmits the voice packet to the data inserter in step 464. In the presence of the additional data, the data inserter inserts the additional data into the voice packet in step 470a and transmits the resulting voice packet to the peer terminal in step 472a.

However, if packet bypass is available in step 454, the voice packet from the network is directly provided to the data inserter in step 466. In step 468, the vocoder controller determines whether an additional message is to be transmitted by the voice packet. In the absence of the additional message, the voice packet is transmitted to the terminal in step 472b. In the presence of the additional data, the data inserter inserts the additional data into the voice packet in step 470b and transmits the resulting voice packet to the peer terminal in step 472b.

In the case where the packet bypass is available, voice coding and decoding are also performed so as to ensure the operation continuity of the voice encoder in step 474. To be more specific, the voice decoder generates a PCM signal by decoding a voice packet received from the network in step 476 and outputs the PCM signal to the voice encoder in step 478. In step 480, the voice encoder generates a voice packet by encoding the PCM signal. The voice packet is not provided to either the data inserter or the peer terminal.

In accordance with embodiments of the present invention as described above, since packet bypass is adaptively performed for digital mobile communications between terminals in a digital communication system such as VoIP, voice quality degradation caused by iterative voice coding and decoding is prevented and additional data or message can be inserted into a voice packet very simply, while minimizing voice quality degradation. Furthermore, excellent communication performance is provided even under a fast changing communication environment.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A voice packet forwarding apparatus in a digital communication system comprising:
    a switched vocoder module comprising a plurality of switches to switchably connect inputs and outputs of the vocoder module for: directly passing a voice packet received from a packet terminal to a digital communication network or a pulse code modulation (PCM) signal decoded from the voice packet to the digital communication network; and
 directly passing a voice packet received from the digital communication network to the packet terminal, converting the voice packet and transmitting the changed voice packet to the packet terminal, or transmitting voice packet coded from a PCM signal received from the digital communication network,
    the packet terminal being able to communicate with another packet terminal or a public switched telephone network (PSTN) terminal over the digital communication network;
a data inserter coupled with at least one of said inputs and said outputs of said switches for, in the presence of data other than a voice to be transmitted to the packet terminal, inserting the data in the voice packet received from the switched vocoder module and transmitting the voice packet with the data to the packet terminal if the communications with the digital communications network is packet interfacing; and
    a controller coupled with said switches for controlling the plurality of switches of the switched vocoder module and the data inserter depending on whether communications with the digital communication network are PCM interfacing or packet interfacing wherein the switched vocoder module further comprises:
    a voice encoder coupled between at least two of said switches for generating the voice packet by encoding the received PCM signal a voice decoder coupled between at least two of said switches for generating the PCM signal by decoding the received voice packet and the plurality of switches for selectively connecting inputs and outputs of the digital communication network, the packet terminal, the voice decoder, and the voice encoder,
    wherein the controller is configured to determine, on a frame by frame basis, a data rate for the voice encoder according to a size of the data for inserting the data in the voice packet when the data is transmitted to the packet terminal, and determine the data rate as a full data rate for the voice encoder when the data is not transmitted to the packet terminal,
and wherein the plurality of switched comprise a first switch for connecting the output of the digital communication network or the voice decoder to the input of the voice encoder to the data inserter a third switch for connecting the output of the digital communication network or the packet terminal to the input of the voice decoder and a fourth switch for connecting the output of the voice decoder or the packet terminal to the digital communication network.

2. The voice packet forwarding apparatus of claim 1, wherein the controller is configured to:
    determine on a frame by frame basis whether communications with the digital communication network are PCM interfacing or packet interfacing; and
    control an input of the first switch to be connected to the network, an input of the second switch to be connected to the voice encoder, an input of the third switch to be connected to the packet terminal, and an input of the fourth switch to be connected to the voice decoder, if the communications with the digital communication network is PCM interfacing.

3. The voice packet forwarding apparatus of claim 1, wherein the controller is configured to:
    determine on a frame by frame basis whether communications with the digital communication network are PCM interfacing or packet interfacing; and
    control an input of the first switch to be connected to the voice decoder, an input of the second switch to be connected to the voice encoder or the digital communication network, an input of the third switch to be connected to the digital communication network, and an input of the fourth switch to be connected to the packet terminal, if the communications with the digital communication network is packet interfacing.

4. The voice packet forwarding apparatus of claim 3, wherein if packet bypass is possible, the controller is configured to control the input of the second switch to be connected to the digital communication network.

5. The voice packet forwarding apparatus of claim 1, wherein the controller is configured to control vocoding of at least one of the voice encoder and the voice decoder on a frame by frame basis.

6. The voice packet forwarding apparatus of claim 5, wherein the vocoding comprises at least one of noise cancellation, pre-filtering, coding weight parameter determination, and parameter search in the voice encoder.

7. The voice packet forwarding apparatus of claim 5, wherein the vocoding comprises at least one of post-filtering and search in the voice decoder.

8. A method of forwarding and processing a voice packet to connect a packet terminal to a digital communication network in a digital communication system, switched vocoder mule comprising a plurality of switches to switchably connect inputs and outputs of the vocoder module the packet terminal being capable of communicating with another packet terminal or a public switched telephone network (PSTN) terminal over tile digital communication network, comprising the steps of: determining whether communications with the digital communication network are pulse code modulation (PCM) interfacing or packet interfacing and based upon said determination, performing a decoding step if the communications with the digital communication network is PCM interfacing, and performing a message insertion step and a passing of the voice packet step if packet bypass is possible if the communications with the digital communication network is packet interfacing;
  decoding a voice packet received from the packet terminal to a PCM signal by a voice decoder and transmitting the PCM signal to the network and encoding a PCM signal received from the digital communication network to a voice packet by a voice encoder, and transmitting the voice packet to the packet terminal, if the communications with the digital communication network is PCM interfacing;
  determining whether packet bypass is possible if the communications with the digital communication network is packet interfacing;
  passing the voice packet received from the packet terminal directly to the digital communication network and the voice packet received from the digital communication network directly to tile packet terminal, if the packet bypass is possible;
  transmitting the voice packet received from the packet terminal to the digital communication network, decoding the voice packet received from the digital communication network to the PCM signal by tile voice decoder, encoding the PCM signal to the voice packet by the voice encoder, and transmitting the voice packet to tile packet terminal, if tile packet bypass is not possible; and inserting, in the presence of a message other than a voice to be transmitted to tile packet terminal, the message into tile directly passed voice packet or the voice packet coded froth the decoded PCM signal, wherein a data rate for the voice encoder is determined, on a frame by frame basis, according to a size of the message for inserting the message in the voice packet when tile message is transmitted to the packet terminal, and is determined as a full data rate when the message is not transmitted to the packet terminal,
  and wherein the plurality of switched comprise a first switch for connecting the output of the digital communication network or the voice decoder to the input of the voice encoder to the data inserter a third switch for connecting the output of the digital communication network or the packet terminal to the input of the voice decoder and a fourth switch for connecting the output of the voice decoder or the packet terminal to the digital communication network.

9. The method of claim 8, further comprising the step of:
  if the packet bypass is possible, decoding a voice packet received from the network to a PCM signal by the voice decoder and encoding the PCM signal to a voice packet by the voice encoder in order to ensure the operation continuity of the voice encoder.

10. The method of claim 8, further comprising the step of:
  controlling vocoding of at least one of the voice encoder and the voice decoder on a frame by frame basis.

11. The method of claim 10, wherein the vocoding comprises at least one of noise cancellation, pre-filtering, coding weight parameter determination, and parameter search in the voice encoder.

12. The method of claim 10, wherein the vocoding comprises at least one of post-filtering and search in the voice decoder.

13. The method of claim 8, wherein the step of determining whether communications with the digital communication network are pulse code modulation (PCM) interfacing or packet interfacing is performed on a frame by frame basis of vocoding.

* * * * *

UNITED STATES PATENT AND TRADEMARK OFFICE
CERTIFICATE OF CORRECTION

PATENT NO. : 8,363,638 B2
APPLICATION NO. : 11/338888
DATED : January 29, 2013
INVENTOR(S) : Ho-Chong Park et al.

It is certified that error appears in the above-identified patent and that said Letters Patent is hereby corrected as shown below:

In the Claims

Col. 13, line 57, a --,-- should be added after the word "module", and the line should read: vocoder module, for: directly passing a voice packet Col. 14, line 35, the word "switched" should be replaced with the word "switches", and the line should read: and wherein the plurality of switches comprise a first switch Col. 14, line 38, a --,-- should be added after the word "inserter", and the line should read: the data inserter, a third switch for connecting the output of the Col. 14, line 40, a --,-- should be added after the word "decoder", and the line should read: input of the voice decoder, and a fourth switch for connecting Col. 15, line 18, the --,-- after the word "system" should be deleted, omitted text should be added between the word "system," and "switched", the word "mule" should be replaced with the word "module", and the line should read:
in a digital communication system using a switched vocoder module Col. 15, line 20, a --,-- should be added after the word "module", and the line should read: inputs and outputs of the vocoder module, the packet terminal Col. 15, line 23, the word "tile" should be replaced with the word "the", and the line should read: over the digital communication network, comprising the Col. 15, line 47, the word "tile" should be replaced with the word "the", and the line should read: network directly to the packet terminal, if the packet Signed and Sealed this
Fourteenth Day of May, 2013

Teresa Stanek Rea
*Acting Director of the United States Patent and Trademark Office*

CERTIFICATE OF CORRECTION (continued)

U.S. Pat. No. 8,363,638 B2

Col. 16, line 7, the words "tile" should be replaced with the words "the", and the line should read: the packet terminal, if the packet bypass is not possible;

Col. 16, line 9, the word "tile" should be replaced with the word "the", and the line should read: voice to be transmitted to the packet terminal, the mes- Col. 16, line 10, the word "tile" should be replaced with the word "the", and the line should read: sage into the directly passed voice packet or the voice Col. 16, line 11, the word "froth" should be replaced with the word "from", and the line should read: packet coded from the decoded PCM signal, wherein a Col. 16, line 14, the word "tile" should be replaced with the word "the", and the line should read: inserting the message in the voice packet when the mes- Col. 16, line 18, the word "switched" should be replaced with the word "switches", and the line should read: and wherein the plurality of switches comprise a first Col. 16, line 21, omitted text should be added between the word "encoder" and "to", a --,-- should be added after the word "inserter", and the line should read:
voice encoder, a second switch for connecting the output of the digital communication network or the voice encoder to the data inserter, a third switch for Col. 16, line 24, a --,-- should be added after the word "decoder", and the line should read: decoder, and a fourth switch for connecting the output of